(12) United States Patent
Schadlich

(10) Patent No.: US 10,233,691 B2
(45) Date of Patent: Mar. 19, 2019

(54) ACTUATOR FOR DRIVING A HOME-AUTOMATION SCREEN AND INSTALLATION COMPRISING SUCH AN ACTUATOR

(71) Applicant: Frank Schadlich, Cordon (FR)

(72) Inventor: Frank Schadlich, Cordon (FR)

(73) Assignee: SOMFY SAS, Cluses (FR)

( * ) Notice: Subject to any disclaimer, the term of this patent is extended or adjusted under 35 U.S.C. 154(b) by 567 days.

(21) Appl. No.: 14/320,854

(22) Filed: Jul. 1, 2014

(65) Prior Publication Data

US 2015/0008801 A1 Jan. 8, 2015

(30) Foreign Application Priority Data

Jul. 3, 2013 (FR) .................... 13 56503

(51) Int. Cl.
| | | |
|---|---|---|
| *H02K 1/27* | (2006.01) | |
| *E06B 9/70* | (2006.01) | |
| *E06B 9/68* | (2006.01) | |
| *E06B 9/72* | (2006.01) | |
| *H02K 7/102* | (2006.01) | |
| *H02K 7/116* | (2006.01) | |

(52) U.S. Cl.
CPC ............ *E06B 9/68* (2013.01); *E06B 9/72* (2013.01); *H02K 7/102* (2013.01); *H02K 7/116* (2013.01); *H02K 2207/03* (2013.01)

(58) Field of Classification Search
CPC .... H02K 7/116; H02K 7/102; H02K 2207/03; E06B 9/72; E06B 9/68; B65H 16/06; B65H 75/48; G05B 11/26; G08C 19/00; H02P 3/00; H02P 3/04; H02P 3/12; H02P 7/285

See application file for complete search history.

(56) References Cited

U.S. PATENT DOCUMENTS

| | | | | |
|---|---|---|---|---|
| 4,059,779 A | * | 11/1977 | Wistinghausen | ....... F16D 51/00 310/77 |
| 4,615,371 A | * | 10/1986 | Clauss | ............... E04F 10/0648 160/22 |
| 5,220,721 A | * | 6/1993 | Thierry | ............... H02K 7/1028 29/598 |
| 5,699,847 A | * | 12/1997 | Villette | .................. E06B 9/308 160/84.02 |
| 6,066,106 A | * | 5/2000 | Sherman | ............. A61H 31/006 601/134 |
| 8,604,736 B2 | | 12/2013 | Grehant et al. | |
| 9,175,514 B2 | * | 11/2015 | Ducornetz | ............. E06B 9/174 |
| 2009/0090805 A1 | * | 4/2009 | Hwaung | .................. E06B 9/72 242/390.1 |

(Continued)

FOREIGN PATENT DOCUMENTS

| | | |
|---|---|---|
| CN | 1384994 A | 12/2002 |
| CN | 2554859 Y | 6/2003 |

(Continued)

*Primary Examiner* — Thomas Truong
*Assistant Examiner* — Leda Pham
(74) *Attorney, Agent, or Firm* — Young & Thompson

(57) ABSTRACT

This actuator for driving a home-automation screen includes an electric motor (M), a reduction gear (R) for transmitting the movement of the motor to the home-automation screen and a brake. The actuator includes a direct current electronic switching motor (M) and a mechanical brake (2) having a continuous drag torque.

12 Claims, 2 Drawing Sheets

(56) References Cited

U.S. PATENT DOCUMENTS

| | | | | |
|---|---|---|---|---|
| 2009/0167119 A1* | 7/2009 | Nakayama | ............ | H02K 37/04 310/49.45 |
| 2010/0320855 A1* | 12/2010 | Lagarde | ................ | E06B 9/72 310/77 |
| 2011/0203754 A1* | 8/2011 | Mullet | .................. | E06B 9/42 160/405 |
| 2014/0009042 A1* | 1/2014 | Cavarec | ................ | H02K 1/14 310/67 R |

FOREIGN PATENT DOCUMENTS

| | | | | |
|---|---|---|---|---|
| CN | 101884165 A | 11/2010 | | |
| CN | 101929303 A | 12/2010 | | |
| EP | 0 508 949 A1 | 10/1992 | | |
| EP | 0 976 909 A2 | 2/2000 | | |
| EP | 1911951 A1 * | 4/2008 | ............ | F02D 11/10 |
| EP | 1 979 569 | 10/2008 | | |
| EP | 2 267 330 A1 | 12/2010 | | |
| FR | 2610668 B1 | 10/1990 | | |
| FR | 2 837 634 A1 | 9/2003 | | |
| FR | 2922385 A1 | 4/2009 | | |
| FR | 2 972 872 A1 | 9/2012 | | |
| FR | 2972869 A1 * | 9/2012 | ............ | E06B 9/72 |
| WO | 00/65709 A1 | 11/2000 | | |
| WO | 2006/107597 A1 | 10/2006 | | |
| WO | 2007/069288 A2 | 6/2007 | | |
| WO | 2007/085570 A1 | 8/2007 | | |

* cited by examiner

ACTUATOR FOR DRIVING A HOME-AUTOMATION SCREEN AND INSTALLATION COMPRISING SUCH AN ACTUATOR

FIELD OF THE INVENTION

The invention relates to an actuator for driving a home-automation screen such as a rolling shutter, blind, curtain, gate, projection screen or garage door.

BACKGROUND OF THE INVENTION

In the field of actuators for driving home-automation screens, it is known to use a braking device, for, on one hand, braking the movement on approaching an obstacle such as an end-of-travel stop, and, on the other, locking the load when the motor is not operating. In the case of a home-automation screen such as a small blind or curtain, the lightness of the home-automation screen means that the torque applied by the screen on the motor, particularly in the descent phase, is low. In this way, it is not necessary to equip the actuator with an external braking device, since the motor may be braked itself by short-circuiting or reluctance. This braking may be completed by the use of an irreversible reduction gear which does not transmit the torque applied by the load to the motor.

For larger screens, it is however essential to use an actuator comprising a mechanical or electromechanical brake external to the motor, to ensure personal protection.

Such an actuator, described in EP-A-0 508 949, comprises an asynchronous type electric motor, a reduction gear and a plate brake suitable for moving under the action of the magnetic field produced by the motor windings. Asynchronous motors have the advantage of being suitable for being connected directly to the mains but the variable-speed control thereof is complex since it involves adjusting the frequency of the control signal while retaining the power required for operation. This generally involves oversizing the motor.

To remedy this problem in respect of the variable-speed control of the asynchronous motor, it is known to equip the actuators for driving home-automation screens with direct-current, brush and collector or electronic switching motors. In the latter, the rotor is formed by one or a plurality of permanent magnets, whereas the stator is formed by a set of coils; switching the power supply of the various coils makes it possible to create a rotating magnetic field which rotates the magnets of the rotor. Electronic switching motors do not use a brush-collector system, rendering such motors more robust. However, this type of motor requires a reliable and complex electronic control unit.

In most actuators for driving a home-automation screen, it is necessary to know the position of the output shaft at all times. This is carried out either by a mechanical counting unit, driven by a rotary element rigidly connected to the motor output shaft or by an electronic counting unit, particularly counting the number of motor switches. In the case of counting at the motor output or at the rotor, this accurately reflects the position of the motor, but is imprecise in relation to the actual position of the load. Conversely, counting closer to the load, for example at the rotation of a home-automation screen winding tube, is more reliable in respect of the actual position thereof, but requires a more complex design.

The integration of an electronic switching motor in an actuator for driving a home-automation screen logically prompts the use of electronic referencing of the rotor position. However, if the motor is used with a brake operating in on/off mode, such as a plate brake, the motor is liable to operate as a generator on some operating ranges, while it is driven by the load, giving rise to heat dissipation issues.

SUMMARY OF THE INVENTION

The invention is particularly intended to remedy these drawbacks by proposing an actuator for driving a home-automation screen that is easy to control, relatively noiseless and does not require a complex electronic control module.

For this purpose, the invention relates to an actuator for driving a home-automation screen comprising an electric motor, a reduction gear for transmitting the movement of the motor to the home-automation screen and a brake. According to the invention, the motor is an electronic switching electric motor and the brake is a mechanical brake having a continuous drag torque.

By means of the invention, the association of a direct current electronic switching motor with a mechanical brake makes it possible, when lowering the screen, to dissipate the energy generated by the load. In this way, the motor never operates as a generator. Moreover, the use of an electronic switching motor enables superior speed regulation.

According to advantageous but non-mandatory aspects of the invention, an actuator for driving a home-automation screen may comprise one or a plurality of the following features, taken in any permissible combination:

The brake is a spring brake comprising a helical spring which is mounted tightly in a drum, the two ends of the spring being curved towards the inside of the cylinder and each engaging with a part rigidly connected to a brake input shaft and with a tappet rigidly connected to a brake output shaft.

Alternatively, the brake is a spring brake comprising a helical spring which is mounted tightly about a hub, the two ends of the spring being curved towards the outside of the hub and each engaging with a part rigidly connected to a brake input shaft and with a tappet rigidly connected to a brake output shaft.

The spring is a helical spring with adjoined turns.

Alternatively, the brake is a cam brake.

The brake is arranged between two stages of the reduction gear.

The actuator comprises means for referencing the position of a rotor of the motor integrated in the electronic switching module of the coils of a stator of the motor.

The actuator comprises sensors of rotation of a rotor of the motor detecting the rotor position.

The actuator comprises means for restoring at least a portion of the signals for referencing the position of a rotor of the motor.

The invention finally relates to an installation for operating a home-automation screen, this installation comprising a tube around which the screen is suitable for being wound and an actuator for driving the tube as described above.

The invention also relates to an installation for operating a home-automation screen, this installation comprising a drum around which a cord of the screen is suitable for being wound and an actuator for driving the drum as described above.

BRIEF DESCRIPTION OF THE DRAWINGS

The invention and further advantages thereof will emerge more clearly in the light of the following description of two embodiments of an actuator for driving a home-automation screen according to the principle thereof, with reference to the appended figures wherein.

DETAILED DESCRIPTION OF THE INVENTION

Figure 1:
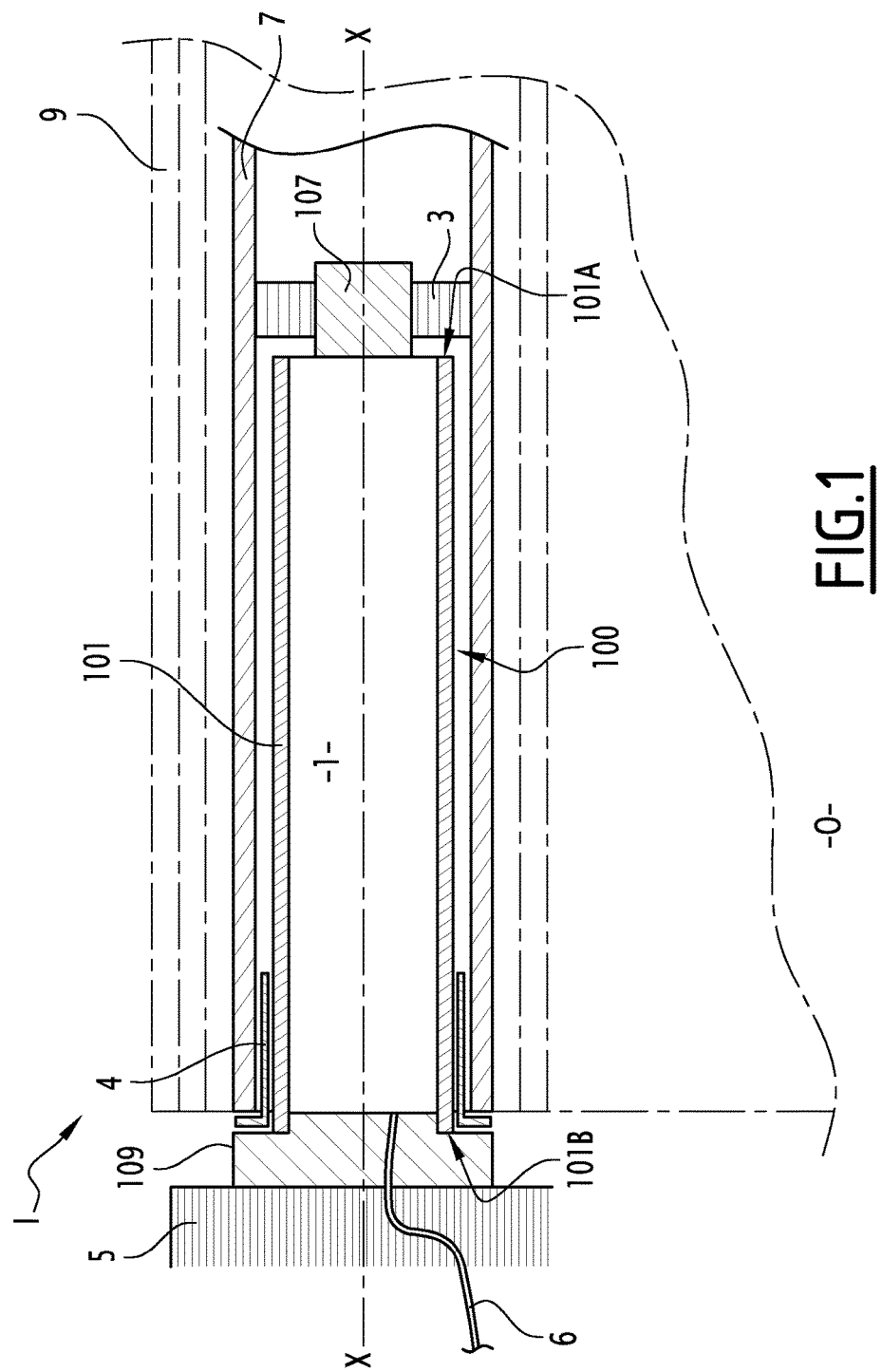
FIG. 1 is a basic cross-section of an installation for operating a home-automation screen according to the invention.

FIG. 1 represents an installation I for operating a home-automation screen according to the invention. The installation I comprises a winding tube 7 around which the apron 9 is wound and unwound. The tube 7 is rotated by an actuator 1 about an axis of revolution X-X and is arranged horizontally in the upper part of an opening O. The opening O is, for example, an opening provided in the walls of a building. Such a wall is represented, in FIG. 1, by a frame 5. The actuator 1 is positioned in a cylindrical casing 101 and is attached to the frame 5 by means of an attachment part 109 projecting at one end 101B of the cylindrical casing 101. On the side opposite the attachment part 109, an output shaft 107 projects at a second end 101A of the cylindrical casing 101 and bears a ring 3. This ring 3 is rotatably connected to the tube 7 about the axis X-X. In this way, the actuator 1 rotates the winding tube 7 about the axis X-X. A power supply cable 6 supplies the energy required for the operation of the actuator 1 and a plain bearing 4 is inserted coaxially between the cylindrical casing 101 and the tube 7 to enable the tube 7 to slide around the cylindrical casing 101.

Figure 2:
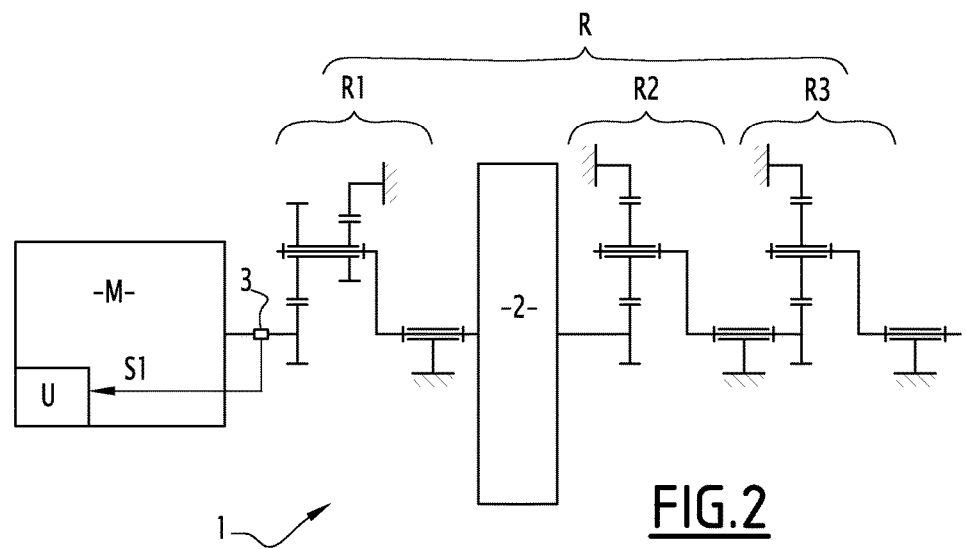
FIG. 2 is a schematic view of an actuator belonging to the installation in FIG. 1.

FIG. 2 represent in more detail the actuator 1 of the installation I. This actuator 1 comprises an electric motor M, a reduction gear R and a mechanical brake 2. The electric motor M is a direct current motor with electronic switching. For this reason, it comprises an internal rotor formed by one or a plurality of permanent magnets and a stator comprising coil windings. The coils are each powered in a switched manner to create a rotating magnetic field, wherein the rotor is placed. The magnets of the rotor thus rotate under the effect of this magnetic field. Moreover, electronic switching motors do not have brush-collector systems, limiting friction between the parts and rendering the motor more robust and quieter. Furthermore, this type of motor is controlled easily with suitable electronics and enables fine adjustment of the acceleration, speed and efficiency of the motor.

At the motor output, a first stage R1 of the reduction gear R is arranged. The brake 2 is arranged between the first stage R1 and a second stage R2 of the reduction gear R. In this case, the reduction gear comprises a third stage R3 arranged at the output of the second stage R2.

Arranging the brake 2 in the stages of the reduction gear R offers a number of advantages. Firstly, the brake 2 is a mechanical type brake. It thus requires a minimum angular clearance to be able to function. As a result of this angular clearance, the brake tends to slip, or slip in jerks. In principle, this is detrimental to the operation of the actuator, since the unwinding and winding movement of the home-automation screen is liable to be irregular. For this reason, the brake 2 is positioned in the vicinity of the output of the motor M. In this way, the angular clearance of the brake 2 is distributed downstream in the various stages of the reduction gear R. However, it is not advisable to position the brake 2 at the output of the motor M as the input speed thereof would be too high. Indeed, a high speed at the input of the brake 2 would give rise to substantial vibrations due to unbalances of the rotating parts. In this way, the compromise is that of positioning the brake 2 between the first stage R1 and the second stage R2 of the reduction gear R.

Figures 3, 4:
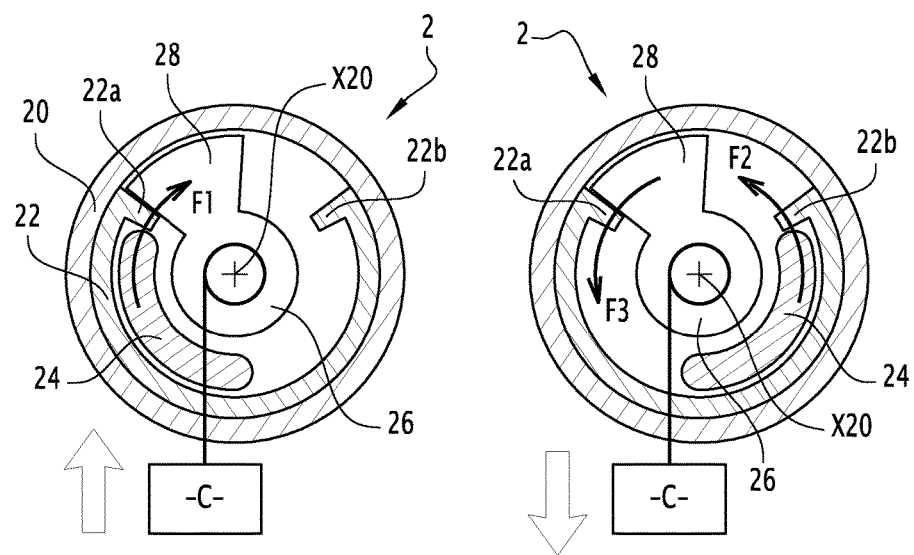
FIG. 3 is a basic cross-section of a spring brake of the actuator in FIG. 2, during a load raising stage.
FIG. 4 is a cross-section similar to FIG. 3, during a load descent phase.

FIGS. 3 and 4 represents in more detail the operation of the brake 2. The brake 2 is a spring brake. It comprises a cylindrical drum 20 centred on an axis X20. The input and output shafts of the brake each have an axis of rotation convergent with the axis X20.

The input shaft of the brake corresponds to the output shaft of the first stage R1 of the reduction gear R, whereas the output shaft of the brake corresponds to the input shaft of the second stage R2 of the reduction gear R. A spring 22 is tightly mounted inside the drum 20, i.e. the stress-free external diameter thereof is greater than the internal diameter of the drum 20. This is referred to as a "drum" type design.

The spring 22 is a helical spring with adjoined turns and comprises, at both ends thereof, two tabs 22a and 22b which are curved, radially relative to the axis X20, inwards. The input shaft of the brake 2 cannot be seen in the figures but it is rigidly connected to a part 24 arranged radially inside the spring 22. This part 24 is a cylinder portion centred on the axis X20 which can engage with either of the tabs 22a and 22b of the spring 22. Indeed, when the input shaft of the brake 2 rotates, the part 24 actuates, in the rotational movement thereof about the axis X20, the tab 22a or the tab 22b according to the direction of rotation of the input shaft. The output of the brake 2 is formed by an output axis 26 bearing a tappet 28 wherein the external diameter is slightly less than the internal diameter of the drum 20. Similar to the part 24, the tappet 28 engages, in the rotational movement thereof about the axis X20, with either of the tabs 22a and 22b.

FIG. 3 illustrates the operation of the brake during the raising of a load C by the actuator. The load C is a home-automation screen such as a shutter, blind or grate. For clear comprehension of the diagram, the load C winds around the axis 26. In practice, the load C winds around the tube 7.

To move the load C upwards, it is necessary to rotate the motor M in the clockwise direction in FIG. 2. This movement is represented in FIG. 2 by an arrow F1. The rotation of the motor in the direction of the arrow F1 results in rotation of the input shaft of the brake 2 and thus the part 24 about the axis X20 in the direction F1. The part 24 thus comes into contact with the tab 22a of the spring 22, tending to elongate the spring 22. This elongation gives rise to a reduction in the external diameter thereof. In this way, the friction between the spring 22 and the drum 20 is reduced, enabling the rotational movement of the part 24. In the movement thereof, the part 24 rotates the tappet 28 and the shaft 26 in the same direction about the axis X20. The continuation of the movement gives rise to slippage of the assembly formed by the part 24, the spring 22 and the tappet 28 along the direction F1 in the drum 20. The load C rises.

In practice, when the load C is raised by the actuator 2, the load is liable to vary. For example, in the case of a rolling shutter, the load exerted by the shutter on the drum varies particularly according to the proportion of the shutter apron hanging under the drum, thus the degree of opening of the shutter. When the last shutter slat lifts from the ground, the load to be raised is at a maximum, whereas, when the shutter is almost open, the motor torque to be applied to finish raising the rolling shutter is lower. The motor torque thus needs to be adapted according to the load to be lifted. However, the motor speed inversely proportional to the torque is merely deduced from the rotation of the rotor, i.e. at a distance from the load. Indeed, the brake and the reduction gear R in particular are inserted along the kinematic linkage. For this, the motor comprises an electronic speed control unit U, suitable for modulating the output speed of the motor so as to supply a constant rotational speed at the output of the brake 2. When raising the load C, the motor M is braked by the resistant torque exerted thereby. The motor speed is thus readjusted automatically according to the load C to be lifted. At the actuator output, the speed is constant, offering a benefit particularly in the alignment of various supporting products on a front. Indeed, in the event of various actuators adjusting a plurality of screens, having a constant brake output speed ensures the alignment of the various screens with each other. This is more pleasant for the user when lowering or raising a plurality of screens simultaneously. The constant speed at the actuator output offers guaranteed speed all along the travel and thus gives rise to a high-quality aspect since there is no sluggish or noisy motor effect due to load variations. In practice, the electronic speed control unit U is integrated in the electronic switching module of the coils of the stator of the motor M so as not to externalise the electronic part and not diminish the compact design of the actuator.

Moreover, in an actuator for driving a home-automation screen, it is necessary to monitor the position of the home-automation screen, i.e. the shutter or the blind to be able to determine precisely when it reaches the end of travel thereof. For this reason, the actuator 1 comprises means for referencing the position of the rotor of the motor M. These means consist of a position encoder 3 which can be integrated in the motor or directly in the output shaft of the motor M, as shown in FIG. 2.

If the position encoder is integrated in the motor, the position is measured by counting the number of switches occurring in the motor. This counting operation is performed directly by the electronic speed control unit U. It results in the number of revolutions completed by the motor and, consequently, the position of the home-automation screen.

Integrating a spring brake on the kinematic linkage between the motor and the winding tube and particularly in the reduction gear R of the actuator 1, prevents the motor from operating as a generator as this would gives rise to errors in respect of the referencing of the rotor position. The action of the brake 2 occurs more particularly in the descent phase of the actuator. This descent phase is represented in FIG. 3. During this phase, the load C rotates the output shaft 26 in the anti-clockwise direction. This rotation is represented, in FIG. 3, by an arrow F3. In the movement thereof, the shaft 26 actuates the tappet 28 which comes into contact with the tab 22a of the spring 22. The spring 22 is thus compressed, resulting in an increase in the external diameter of the spring 22. The spring 22 is thus locked in the drum 20. In this way, when the motor is not operating, the load C is locked by means of the spring 22. This particular ensures personal safety under the home-automation screen.

To lower the home-automation screen, the motor M rotates in the direction of an arrow F2, i.e. in the anti-clockwise direction in FIG. 4. This gives rise to the part 24 coming into contact with the tab 22b of the spring 22. This movement involves an elongation of the spring 22 and thus a decrease in the external diameter of the spring 22. In this way, the load C can slide, in a controlled manner, without accelerating the speed of the motor M. The motor M thus does not operate as a generator. In this descent phase, the motor runs so as to slide the output shaft at a constant speed. The motor speed is thus adapted according to the load applied on the drive shaft.

The fact that the spring 22 is tightly mounted in the drum 20 implies that the brake 2 is in continuous friction. In other words, the brake 2 has a continuous drag torque dissipating the energy generated by the load on descent and compensated by an "overtorque" by the motor in ascent. In this way, the brake 2 masks the variations of the load C on the motor M as the latter are absorbed by the brake. In this document, the term "continuous" characterising the drag torque means that the drag torque adopts a value different to zero regardless of the motor speed or on practically the entire operating range of the motor, apart from one or more values which are cancelled out. For example, some brakes have a zero drag torque when the motor develops a nominal torque, i.e. the torque required to actuate the load.

In a spring brake, it is easier to suppress banging type noises than in a cam brake. Indeed, it is possible to reduce banging noises, particularly occurring between a tappet 28 and the part 24, by inserting for example an elastomer wedge to damp the contact between the parts.

Alternatively, the rotor position is referenced by means of a rotation encoder of the rotor of the motor M detecting the position of this rotor. In practice, three sensors are actually involved, each associated with a stator winding of the motor, making it possible to restore all the referencing signals S1 in respect of the rotor position. These signals S1 are then sent to the electronic speed control unit U to adapt the motor speed accordingly.

According to one alternative embodiment, the position encoder merely comprises 2 sensors, each associated with a stator winding of the motor, and the associated electronic unit is suitable for restoring the missing portion of the signals, associated with the third winding, for referencing the position of the rotor of the motor M.

According to a further alternative embodiment, the rotation encoder of the motor rotor does not comprise any sensor. The rotor position is referenced electronically by the electronic motor control unit. This is referred to as a sensorless electronic switching motor.

In an alternative embodiment not shown, the brake 2 is a cam brake designed to have a quasi-continuous drag torque. This drag torque is zero at the nominal torque and different to zero outside the nominal torque. In this way, the cam brake has a residual friction when only partially activated, for example to retain the load on descent.

Alternatively, the reduction gear R of the actuator 2 comprises a number of stages of the reduction gear R which is different to three and strictly greater than 1.

In an alternative embodiment not shown, the brake is a spring brake comprising a helical spring tightly mounted about a hub, both ends of the spring being curved outwards from the hub and each engaging with a part rigidly connected to a brake output shaft.

In an alternative embodiment not shown, the actuator 1 rotates a drum around which one or a plurality of cords of the screen are wound. This applies, inter alia, to blind type screens wherein the cords are attached to a load bar in the lower part of the blind and are suitable to adjusting the height of the blind.

The alternative embodiments and embodiments envisaged above may be combined to produce further embodiments of the invention.

The invention claimed is:

1. An actuator (1) for driving a home-automation screen (C), the actuator comprising:
    an electric motor (M) comprised of a rotor formed by at least one permanent magnet and a stator formed by a set of coils;
    a reduction gear (R) for transmitting the movement of the motor to the home-automation screen;
    a brake (2) for resisting the movement of the motor; and
    position referencing means for referencing a position of the rotor of the motor (M) integrated in an electronic switching module of the coils of a stator of the motor (M), the position referencing means configured to measure the position of the rotor by counting a number of switches occurring in the motor,
    wherein the motor is an electronic switching electric motor (M), and
    wherein the brake is a mechanical brake (2) configured to apply a continuous drag torque, said mechanical brake configured so that, in an operation to lower the home-automation screen, the mechanical brake dissipates an energy generated by a load of the home-automation screen upon the reduction gear and electric motor such that the operation to lower the home-automation screen does not cause the electric motor to operate as a generator.

2. The actuator (1) according to claim 1, wherein the brake is a spring brake (2) comprising a helical spring (22) which is mounted tightly in a drum (20), the two ends of the spring (22a, 22b) being curved towards the inside of the cylinder and each engaging with a part (24) rigidly connected to a brake input shaft and with a tappet (28) connected to a brake output shaft.

3. The actuator according to claim 1, wherein the brake is a spring brake comprising a helical spring which is mounted tightly about a hub, the two ends of the spring being curved towards the outside of the hub and each engaging with a part rigidly connected to a brake input shaft and with a tappet rigidly connected to a brake output shaft.

4. The actuator (1) according to claim 2, wherein the spring (2) is a helical spring with adjoined turns.

5. The actuator (1) according to claim 1, wherein the brake is a cam brake.

6. The actuator (1) according to claim 1, wherein the brake is arranged between two stages (R1, R2) of the reduction gear (R).

7. The actuator (1) according to claim 1, further comprising sensors of rotation of the rotor of the motor for detecting the rotor position.

8. The actuator (1) according to claim 1, further comprising:
    means for restoring at least a portion of the signals for referencing the position of the rotor of the motor.

9. An installation (I) for operating a home-automation screen (C), the installation comprising a tube (7) around which the screen is suitable for being wound and an actuator (1) for driving the tube, and the actuator according to claim 1.

10. An installation for operating a home-automation screen, the installation comprising a drum around which a cord of the screen is suitable for being wound and an actuator (1) for driving the drum, and the actuator according to claim 1.

11. An installation, comprising:
    a home-automation screen (C) wound around one of the group consisting of a drum and a tube;
    a frame (5); and
    an actuator (1) comprised of i) a casing (101) having a first end (101B) attached to the frame (5) and a second end (101A) with a projecting shaft (107), the shaft (107) operatively connected to the one of the group consisting of a drum and a tube, the shaft (107) driving the one of the group consisting of a drum and a tube in rotation,
    the actuator further comprising:
        a direct current, electronic switching electric motor (M), comprised of an internal rotor formed by at least one permanent magnet and a stator formed by a set of coils, the coils being switched to create a rotating magnetic field causing the rotor to rotate under an effect of the rotating magnetic field,
        a reduction gear (R) for transmitting the movement of the motor to the one of the group consisting of a drum and a tube,
        a mechanical brake (2) having a continuous drag torque, and
        position referencing means for referencing a position of the rotor of the motor (M) integrated in an electronic switching module of the coils of a stator of the motor (M), the position referencing means configured to measure the position of the rotor by counting a number of switches occurring in the motor,
        said mechanical brake configured so that, in an operation to lower the home-automation screen, the mechanical brake dissipates an energy generated by a load of the home-automation screen upon the reduction gear and electric motor such that the operation to lower the home-automation screen does not cause the electric motor to operate as a generator.

12. The installation of claim 11, wherein,
    the reduction gear (R) comprises a first stage (R1) and a second stage (R2), and
    the mechanical brake (2) is arranged between the first and second stages (R1, R2) of the reduction gear (R).

* * * * *